Oct. 12, 1937.  H. W. PRICE ET AL  2,095,763
CLUTCH CONTROL MECHANISM
Filed Nov. 27, 1931
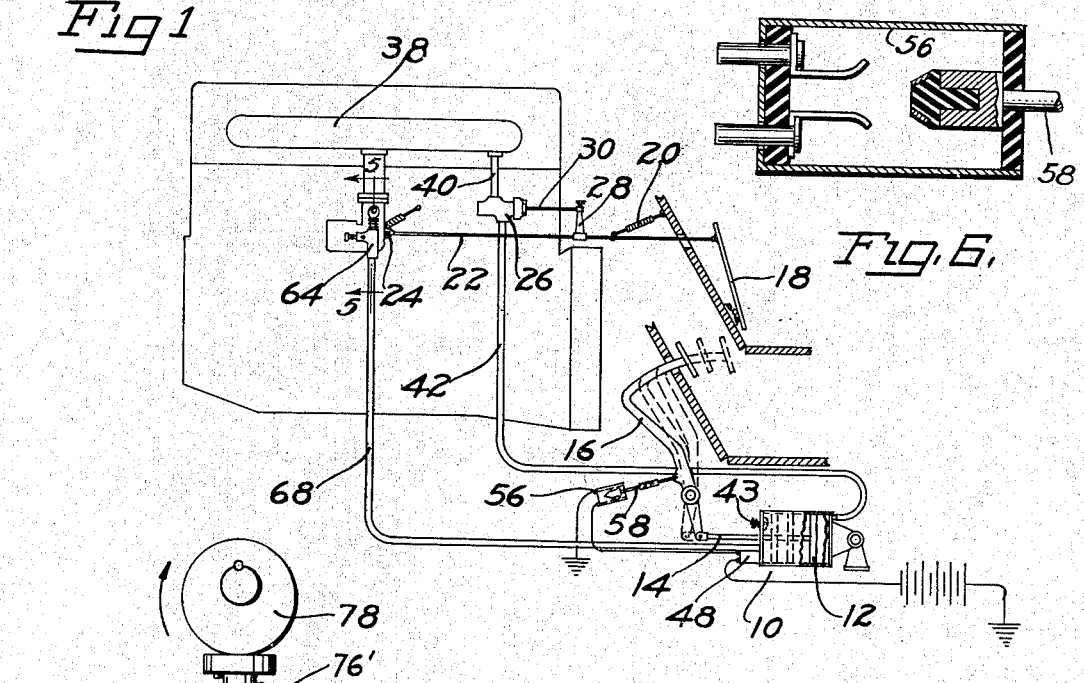
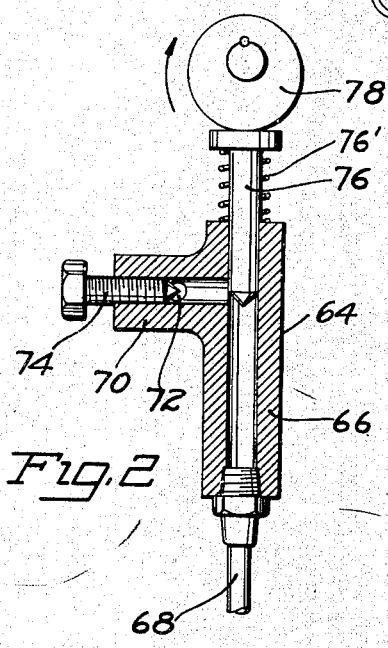
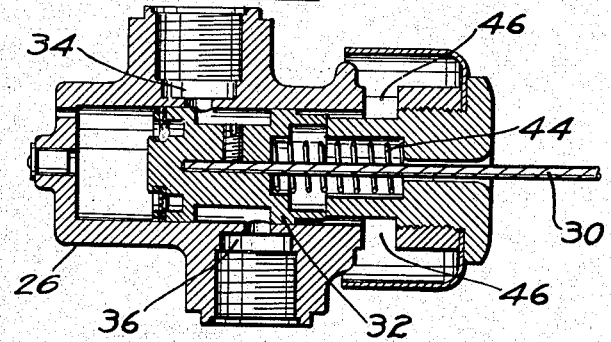
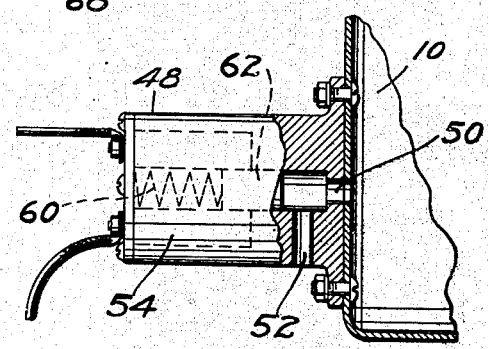
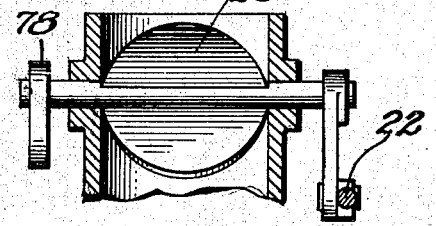
INVENTOR.
HAROLD W. PRICE
EARL R. PRICE
BY H. O. Clayton
ATTORNEY Patented Oct. 12, 1937

2,095,763

UNITED STATES PATENT OFFICE 2,095,763

CLUTCH CONTROL MECHANISM

Harold W. Price and Earl R. Price, South Bend, Ind., assignors to Bendix Aviation Corporation, South Bend, Ind., a corporation of Delaware Application November 27, 1931, Serial No. 577,661

10 Claims. (Cl. 192—.01)

This invention relates to a power operated clutch control mechanism for an automotive vehicle. More specifically, the invention comprehends the control of the clutch engaging operation of a vacuum operated fluid motor whereby the driving clutch plate is permitted to move relatively rapidly, under the action of the clutch spring, during the first part of its clutch engaging movement and relatively slowly immediately prior to the contact of the clutch plates.

To the above end there is suggested the employment of an electrically operated valve, the electrical means being controlled by the clutch pedal, the operation of said valve insuring the aforementioned rapid stage of clutch plate movement, and there is further suggested the employment of a manually controlled bleed valve, actuated in conjunction with the opening of the throttle, and by the means for opening the throttle, for determining the rate of clutch plate movement during the aforementioned clutch plate contacting stage of movement.

Other objects of the invention and desirable details of construction and combinations of parts will become apparent from the following description of a preferred embodiment, which description is taken in conjunction with the accompanying drawing, in which:

Figure 1 is a diagrammatic view of the power operated clutch controlling mechanism constituting the invention;

Figure 2 is a longitudinal sectional view through the manually controlled bleed valve;

Figure 3 is a longitudinal sectional view of the three-way control valve for the clutch controlling fluid motor;

Figure 4 is a view, partly in section, disclosing the combined bleed valve and solenoid unit;

Figure 5 is a sectional view taken on the line 5—5 of Figure 1 and disclosing in detail the connection between the throttle and operating means for the bleed valve; and Figure 6 is a sectional view disclosing in detail the clutch pedal operated switch.

Describing now that embodiment of the invention selected for illustration, there is provided a double-ended fluid motor 10, the piston 12 of which is connected by rod 14 with a conventional clutch pedal 16. The motor is automatically energized to disengage the clutch, by completely releasing an accelerator pedal 18 movable by a return spring 20. The pedal is connected, by rod 22, with a throttle 23, there being a slip joint at 24 in said connection to permit the operation of a motor control valve 26 prior to the opening of the throttle.

The release of the accelerator 18 serves, by virtue of an arm 28 secured to rod 22 and flexible connection 30, to move a recessed piston valve member 32 to the right as shown in Figure 3, thereby connecting valve ports 34 and 36 which are connected respectively to an intake manifold 38 and to the motor 10 by means of flexible conduits 40 and 42. The right compartment of the double-ended motor is then partially evacuated by virtue of the then existing partially evacuated condition of the intake manifold, for, at closed throttle, the engine pistons function as a pump to create a manifold vacuum of some twenty inches of mercury. The clutch pedal is thus moved to the clutch disengaged full line position shown in Figure 1. A check valve 43 permits the movement of the pedal to the left, Figure 1, by permitting an influx of air to the left side of the motor as the piston moves to the right.

Actuation of the accelerator pedal to speed up the engine serves to elongate the spring 20, thereby permitting a compressed valve spring 44, Figure 3, to move the valve piston 32 to the left to connect atmospheric ports 46 with the aforementioned port 36. The influx of air to the motor thus serves to permit the conventional clutch spring, not shown, to reengage the driving clutch plate with the driven plate, moving the clutch pedal to the extreme right dotted line position of Figure 1.

The clutch is thus operated conjointly with the operation of the throttle, the two being controlled by a common operating means; namely, the accelerator pedal. The aforementioned structure, however, forms no part of the instant invention, for the same is in the main similar to the clutch control mechanism disclosed in the patent to Belcia, No. 1,470,272, dated October 9, 1923.

The present invention is particularly directed to means for regulating the clutch engaging movement of the driving clutch plate to simulate the corresponding manual control of the clutch. To this end there is provided means for effecting a relatively rapid first phase of movement of the driving clutch plate and other means for effecting a relatively slow second phase of movement, just prior to the actual engagement of the clutch plates.

The rapid first phase of movement is insured by the opening of a valve 48, Figure 1, thereby opening communication between relatively large ports 50 and 52 to permit a rather rapid efflux of air from the dash-pot or compression side of the double-ended motor. The valve 48 is opened, in the clutch disengaged position of the clutch pedal, by a solenoid 54, Figure 4, the latter being energized by the closing of a switch 56. The movable contact member of said switch is preferably connected to the clutch pedal 16 by an adjustable rod 58. When the clutch pedal has moved to the left dotted line position of Figure 1, the switch 56 is opened, thereby deenergizing the solenoid and permitting a compressed valve spring 60 to move a movable plunger 62 of the valve 48 to the right to cut off communication between ports 50 and 52.

The aforementioned second phase of clutch plate movement is now controlled by a bleed valve 64, detailed in Figure 2. This valve comprises a bored casing 66 connected to the compression side of the motor by a conduit 68. The casing is preferably cast with or otherwise rigidly secured to the carburetor. A bored lateral projection or boss 70 is formed as an integral part of the casing, the bore of the latter registering with the bore of the casing. Projection 70 is also provided with an opening 72, the size of which is controlled by the adjustment of a pointed set screw 74. A spring pressed needle valve member 76 biased to an open position by a spring 76' completes the valve assembly, the latter being actuated by an eccentrically mounted cam 78 to adjustably determine the fluid transmitting connection between the aforementioned bores of the valve.

The cam is preferably mounted on the throttle operating shaft, as disclosed in Figure 5, and is accordingly operated in conjunction with the throttle by the throttle operating rod 22. The needle valve 76 is shown in full lines, Figure 2, in its accelerator released position, and as the throttle is opened by the accelerator the cam is rotated clockwise to permit the valve member 76 to be moved upwardly by its spring.

The degree of bleed or efflux of air from the motor during the aforementioned second phase of clutch plate movement is thus a function of the degree of throttle opening. This, however, is the end desired inasmuch as the engagement of the clutch is rendered relatively rapid at wide open throttle and relatively slow with a minimum of throttle opening.

There is thus provided, in a power operated clutch control mechanism, relatively simple means insuring a clutch engagement which accurately simulates the corresponding manual control of the clutch.

While one illustrative embodiment has been described, it is not our intention to limit the scope of the invention to that particular embodiment, or otherwise than by the terms of the appended claims.

We claim:

1. An automotive vehicle provided with a clutch, a vacuum operated fluid motor for operating said clutch, electrically operated means for controlling a first phase of the clutch engaging operation of said motor and manually operated means for controlling a second phase of the clutch engaging operation of said motor.

2. An automotive vehicle provided with a clutch, a manually operable pedal for operating said clutch, a vacuum operated fluid motor for operating said pedal, electrically operated means for controlling a first phase of the clutch engaging operation of said motor, the operation of said means being controlled by said pedal, and manually operated means for controlling a second phase of the clutch engaging operation of said motor.

3. An automotive vehicle provided with an intake manifold, a throttle and a clutch, a vacuum operated fluid motor for operating said clutch, a fluid transmitting connection between said manifold and motor, electrically operated means for controlling a first phase of the clutch engaging operation of said motor and manually operated means, operable in conjunction with the operation of said throttle, for controlling a second phase of the clutch engaging operation of said motor.

4. In a power clutch operating mechanism for an automotive vehicle provided with an intake manifold and a carburetor, a throttle and a clutch, a double-ended fluid motor, a connection between said motor and clutch, a fluid transmitting connection between one end of said motor and manifold, a three-way control valve in said connection, common means for operating said throttle and three-way valve, a bleed valve mounted on said carburetor and a fluid transmitting connection between the other end of said motor and said bleed valve, said bleed valve being operable by the means for operating said throttle and to a degree depending upon the degree of operation of said throttle.

5. In a clutch controlling mechanism of the class described, a clutch pedal, a double-ended fluid motor operably connected with said clutch pedal and a combined solenoid and bleed valve unit mounted on one end of said motor, said solenoid adapted to operate said valve and be operated in accordance with the position of said clutch pedal, said valve determining the mode of operation of said motor in controlling the engagement of the clutch.

6. In a power operated mechanism for controlling the clutch of an automotive vehicle, said vehicle provided with an intake manifold and a carburetor, a throttle and means for operating said throttle, a clutch operating fluid motor operable by changes in gaseous pressure within said manifold, said pressure being a function of the degree of throttle opening and means mounted on said carburetor and operable by said throttle operating means for controlling the mode of clutch engaging operation of said motor.

7. In an automotive vehicle provided with a clutch and a carburetor, said carburetor including a throttle, a pressure differential operated fluid motor operably connected with said clutch, a control valve for initiating the clutch disengaging and engaging operations of said motor, a motor controlling bleed valve mounted on said carburetor, and connections interconnecting said bleed valve and throttle whereby with operation of said throttle the bleed valve is operated to control the clutch engaging operation of said motor.

8. In a power operated mechanism for operating the clutch of an automotive vehicle, said vehicle being provided with a carburetor having a valve, a valve mechanism for, in part, controlling the operation of said power mechanism, said valve mechanism forming a part of the casting of said carburetor and located immediately adjacent said throttle valve, and means interconnecting said throttle valve and valve mechanism whereby said valve mechanism is operated with the operation of said throttle.

9. In a power operated mechanism for operating the clutch of an automotive vehicle, said vehicle being provided with a carburetor having a valve, a valve mechanism for, in part, controlling the operation of said power mechanism, said valve mechanism forming a part of the casting of said carburetor and located immediately adjacent said throttle valve, and means comprising a cam and spring operated follower, said means interconnecting said throttle valve and valve mechanism whereby said valve mechanism is operated with the operation of said throttle.

10. In automatic clutch operating mechanism for automobiles having an accelerating device, a power device, a clutch actuator, means connecting said clutch actuator to said power device for operation thereby, a relief valve for said power device, and means for controlling said valve including a normally slack connection between the accelerating device and relief valve.

HAROLD W. PRICE.
EARL R. PRICE.